United States Patent [19]
Yagi et al.

[11] Patent Number: 5,314,520
[45] Date of Patent: May 24, 1994

[54] METHOD FOR MANUFACTURING OPTICAL FIBER PREFORM

[75] Inventors: Takeshi Yagi; Tsuguo Satoh; Yoshiaki Koinuma; Kazuaki Yoshida, all of Tokyo, Japan

[73] Assignee: The Furukawa Electric Co., Ltd., Tokyo, Japan

[21] Appl. No.: 15,644

[22] Filed: Feb. 9, 1993

[30] Foreign Application Priority Data

Feb. 12, 1992 [JP] Japan .................. 4-25319
Mar. 13, 1992 [JP] Japan .................. 4-55572

[51] Int. Cl.⁵ .............................. C03C 25/02
[52] U.S. Cl. ................... 65/3.110; 65/18.1; 65/18.3; 264/1.2; 264/1.5; 264/63; 264/125; 264/211.11
[58] Field of Search ........ 264/177.11, 211.11, 264/211.12, 125, 122, 102, 1.2, 1.5, 1.6, 63; 65/3.11, 18.1, 18.3

[56] References Cited

U.S. PATENT DOCUMENTS

| | | | |
|---|---|---|---|
| 4,171,337 | 10/1979 | Rosen et al. | 264/211.11 |
| 4,248,810 | 2/1981 | Erskine | 264/43 |
| 4,620,862 | 11/1986 | Dorn et al. | |
| 4,661,136 | 4/1987 | Dorn et al. | |
| 4,682,995 | 7/1987 | Clasen | 65/18.1 |
| 4,685,946 | 8/1987 | Derks et al. | |
| 4,775,401 | 10/1988 | Fleming et al. | 65/18.1 |
| 4,816,051 | 3/1989 | Clasen et al. | |
| 4,902,328 | 2/1990 | Knauff et al. | |
| 5,114,881 | 5/1992 | Kaneko et al. | 65/18.1 |
| 5,124,101 | 6/1992 | Hirao et al. | 264/122 |
| 5,147,722 | 9/1992 | Koslow | 264/122 |
| 5,155,158 | 10/1992 | Kim | 264/125 |
| 5,169,421 | 12/1992 | Yagi et al. | 65/3.11 |
| 5,185,020 | 2/1993 | Satoh et al. | 65/18.1 |

FOREIGN PATENT DOCUMENTS

| | | |
|---|---|---|
| 0476537A2 | 3/1992 | European Pat. Off. . |
| 0529647A1 | 3/1993 | European Pat. Off. . |
| 0153619 | 9/1985 | Fed. Rep. of Germany . |
| 0197586 | 10/1986 | Fed. Rep. of Germany . |
| 3633307A1 | 3/1988 | Fed. Rep. of Germany . |
| 0265023 | 4/1988 | Fed. Rep. of Germany . |
| 0265024 | 4/1988 | Fed. Rep. of Germany . |
| 59-8208 | 1/1984 | Japan .................. 65/18.1 |
| 3-254412 | 7/1991 | Japan . |
| 1010702 | 11/1965 | United Kingdom . |

OTHER PUBLICATIONS

Journal of Optical Communications, vol. 10, No. 1, Mar. 1989, Berlin De, pp. 2–5, R. Dorn et al., "Mechanical Shaping of Preforms Low Loss at Low Cost".
Database WPI, Week 7708, Derwent Publications Ltd., London, G.B. AN 77-13805 & JP-A-52 004 490 (Kuraray KK) Jan. 13, 1977.

Primary Examiner—Jeffery Thurlow
Attorney, Agent, or Firm—Frishauf, Holtz, Goodman & Woodward

[57] ABSTRACT

A method for manufacturing a preform having steps of obtaining a plastic material by kneading silica powder, a binder, water, and a surfactant, and obtaining a porous preform by extrusion-molding the plastic material. According to this method, a porous preform, which can produce an optical fiber exerting high mechanical strength, can be efficiently manufactured without generating bubbles 11 Claims, 4 Drawing Sheets

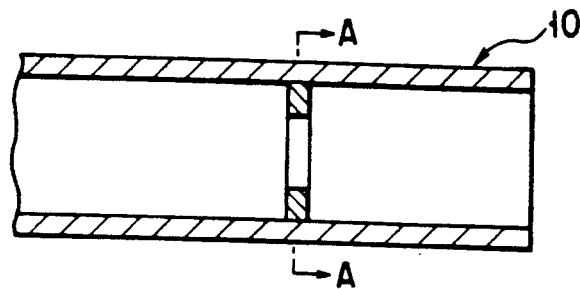 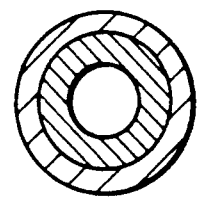
FIG. 1A   FIG. 1B
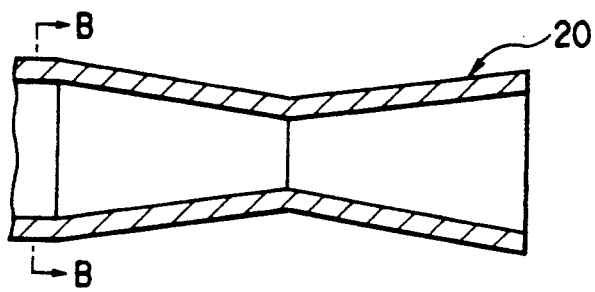 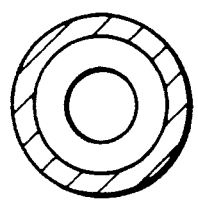
FIG. 2A   FIG. 2B
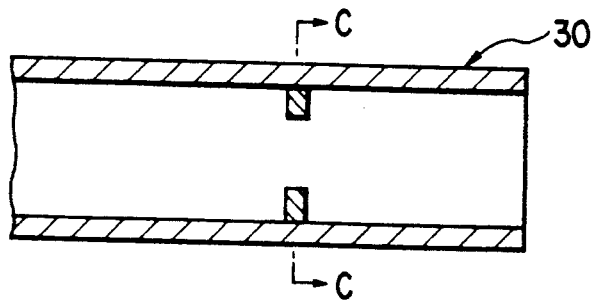 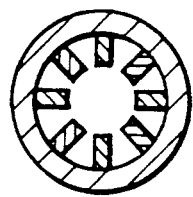
FIG. 3A   FIG. 3B
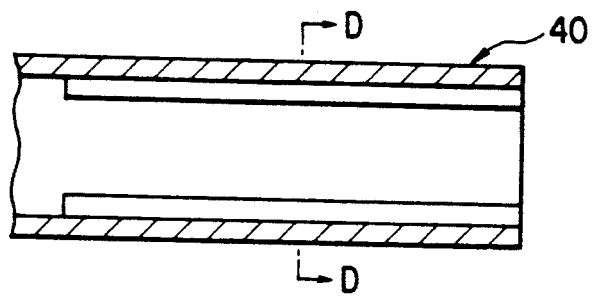 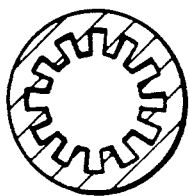
FIG. 4A   FIG. 4B

METHOD FOR MANUFACTURING OPTICAL FIBER PREFORM

BACKGROUND OF THE INVENTION

1. Field of the Invention

The present invention relates to a method for manufacturing an optical fiber preform to be used in the field of communication and optics.

2. Description of the Related Art

Conventionally, there has been performed a method using an extrusion molding as a method for manufacturing an optical fiber preform. In Japanese Patent Application No. 3-254412, the inventors of the present invention proposed a method for forming a core portion and a clad portion at the same time by use of a vacuum extrusion machine. According to this method, as a base material, there is used a material in which binder and water is added to silica powder for applying plasticity.

In the above method, since a vacuum extrusion machine is used, most of the bubbles in the plastic material are removed when the core and clad portions are formed. However, its deaeration effect is insufficient for the manufacture of the optical fiber preform. Due to this, in order to accelerate deaeration, molding is performed at a relative low speed, and the plastic material is retained in the extrusion machine as long as possible. However, deaeration is not sufficiently performed, and bubbles remain on the obtained preform. There is a disadvantage in the optical fiber, which is obtained by providing a degreasing process and a sintering process to the preform on which bubbles are left, and drawing the obtained optical fiber preform, in that the resulting optical fiber has low mechanical strength. Therefore, as a whole, the yield is worsened in the manufacture of the optical fiber.

SUMMARY OF THE INVENTION

An object of the present invention is to provide a method for efficiently manufacturing an optical fiber preform, which can obtain an optical fiber exerting high mechanical strength, without generating bubbles.

The above object can be obtained by a method for manufacturing a preform having the steps of obtaining a plastic material by kneading silica powder, a binder, water, and a surfactant, and obtaining a porous preform by extrusion-molding the plastic material.

Additional objects and advantages of the invention will be set forth in the description which follows, and in part will be obvious from the description, or may be learned by the practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a vertical cross sectional view showing an example of an auxiliary cylinder as an extrusion machine to be used in the method of the present invention;

FIG. 1B is a horizontal cross sectional view taken along the line of A—A of FIG. 1A;

FIG. 2A is a vertical cross sectional view showing another example of an auxiliary cylinder of an extrusion machine to be used in the method of the present invention;

FIG. 2B is a horizontal cross sectional view taken along the line of B—B of FIG. 2A;

FIG. 3A is a vertical cross sectional view showing another example of an auxiliary cylinder of an extrusion machine to be used in the method of the present invention;

FIG. 3B is a horizontal cross sectional view taken along the line of C—C of FIG. 3A;

FIG. 4A is a vertical cross sectional view showing another example of an auxiliary cylinder of an extrusion machine to be used in the method of the present invention;

FIG. 4B is a horizontal cross sectional view taken along the line of D—D of FIG. 4A;

DETAILED DESCRIPTION OF THE PREFERRED EMBODIMENTS

According to the method for manufacturing an optical fiber preform of the present invention from a plastic material containing a surfactant. The surfactant decreases surface energy between silica powder and water; as a result, deaeration from the plastic material is accelerated during extrusion. Therefore, a preform on which few bubbles are left can be obtained.

It is preferable that silica powder having an average grain diameter of 100 $\mu$m or less, particularly a high purity silica powder having an average volume diameter of 0.1 to 20 $\mu$m be used as the silica powder to be used in the plastic material. Moreover, regarding the shape of the silica powder, an equiaxed grain, e.g., a spherical grain is preferable for extrusion. Moreover, silica powder to which a dopant is added may be used so as to control the refractive index.

The surfactant to be used in the present invention is not limited if the surfactant decreases the surface energy between the grain of the silica powder and water. In consideration of the use as a porous preform, a nonionic surfactant is preferably used. For example, an ethyleneoxide type surfactant such as polyoxyethylenealkylether having a HLB (HydrophileLipophile Balance) value in the range of 6 to 10 can be used.

There is no special limitation of the amount of addition of the surfactant in the plastic material. For example, in a case that the ethyleneoxide type surfactant such as polyoxyethylenealkylether having HLB value in the range of 6 to 10 is used as a surfactant, 0.01 to 0.5 parts by weight of surfactant is preferably used relative to 100 parts by weight of silica powder.

A screw type vacuum extrusion machine or a piston type extrusion machine can be used as an extrusion machine. In the case that the piston type extrusion machine is used, deaeration must be performed in advance when the plastic material is kneaded. Moreover, there was used an extrusion machine having an auxiliary cylinder for stopping the rotation of the material between an extrusion screw and a die as an extrusion machine (Japanese Patent Application No. 3-218291). As a result, optical and physical characteristics of the preform was further improved by synergism with a lamination prevention effect. In this case, as an auxiliary cylinder, it is possible to use a cylinder in which a resistance portion is formed by roughening the inner surface of the cylinder, or cylinders 10, 20, 30, and 40 having the shape as shown in FIGS. 1 to 4.

The method of the present invention may be applied to a case in which a core is formed in advance and a clad is formed in the outside of the core, or a case in which the core and clad are formed at the same time. In the case that the clad is formed in the outside of the core, the core may be formed of a core portion and a part of a clad portion.

Figure 5:
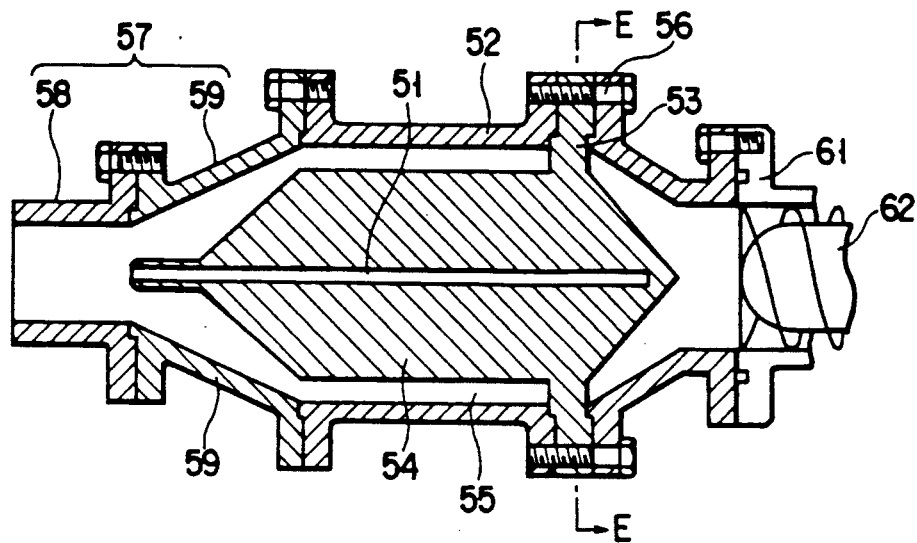
FIG. 5 is a cross sectional view showing an example of an extrusion head of the extrusion machine to be used in the method of the present invention.
Figure 6:
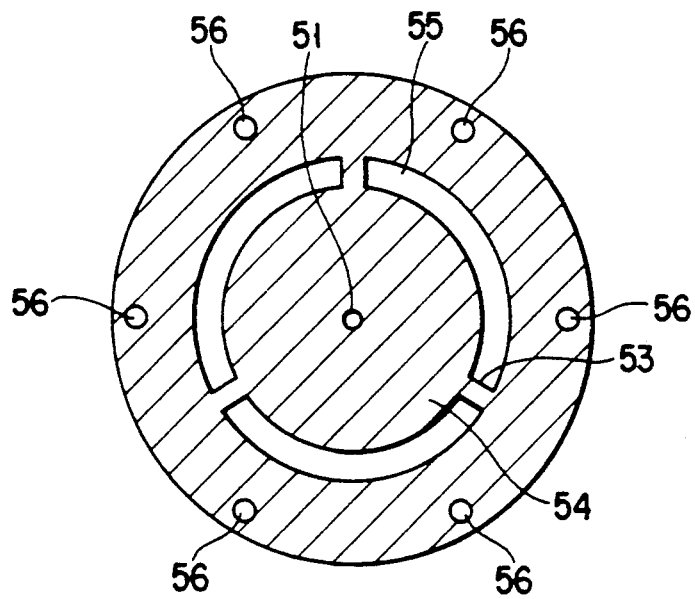
FIG. 6 is a cross sectional view taken along the line of E—E of FIG. 5.

FIG. 5 is a cross sectional view showing an example of an extrusion head of the extrusion machine to be used in the method of the present invention, and FIG. 6 is a cross sectional view taken along the line of E—E of FIG. 5. The extrusion head shown in FIGS. 5 and 6 is attached to the top end of an auger cylinder 61, and arranged on an extended straight line to an axis of an auger screw 62. A rod holding member 54 is supported by a suspending member 53 at the center of a body portion 52 of the extrusion head. A passage 51 for a core glass rod is provided at the center of the rod holding member 54. The passage 51 for the core glass rod and a passage for a clad plastic material are concentrically arranged. The body portion 52 and the suspending member 53 are fixed to each other by a bolt 56. A die 57 comprises a linear portion 58 and a taper portion 59, which are detachable.

The manufacturing method of the porous preform using the extrusion head of FIG. 5 will be explained with reference to FIGS. 7A to 7E.

Figure 7:
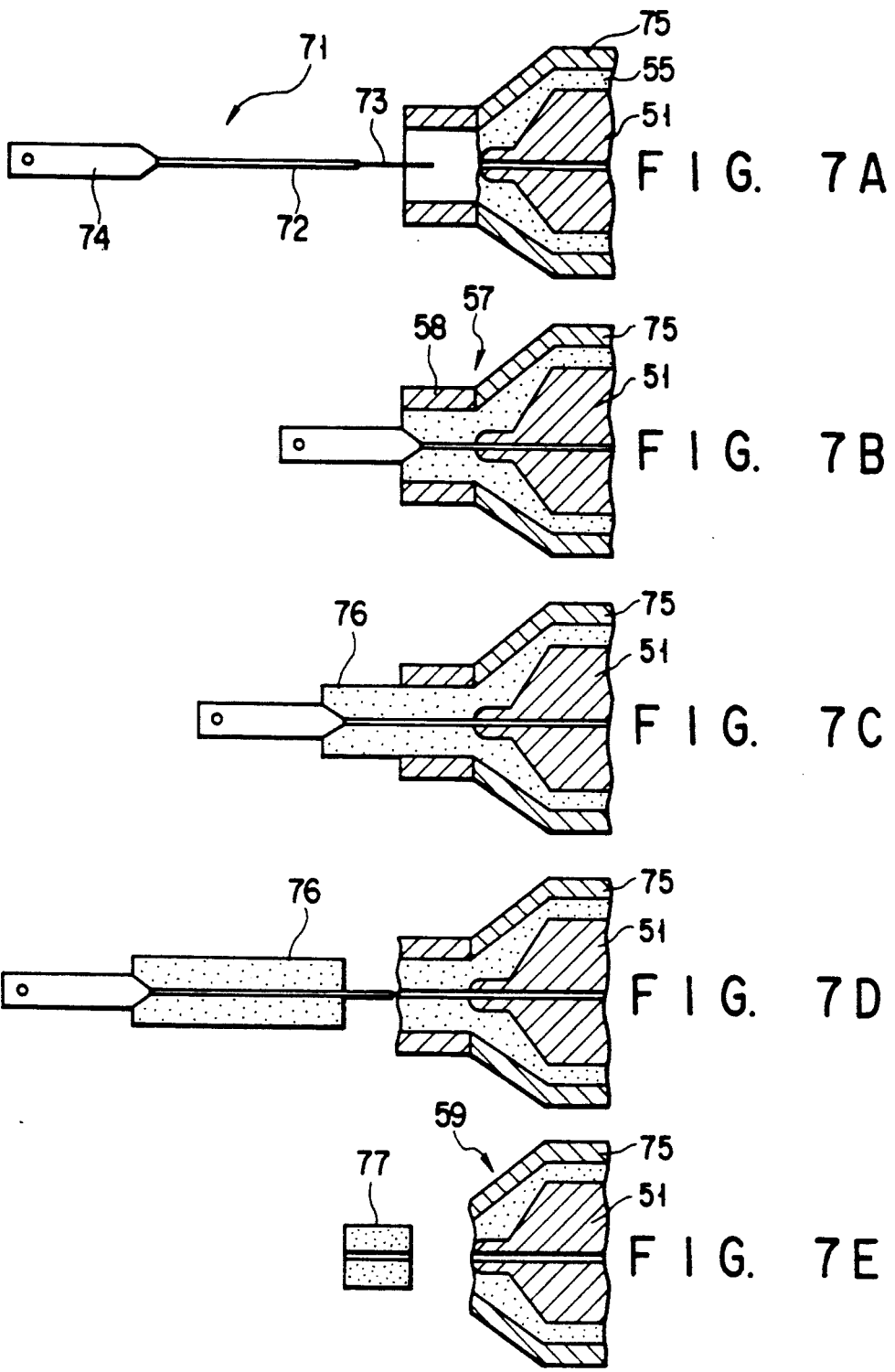
FIGS. 7A to 7E are cross sectional views together showing a manufacturing process of the method of the present invention.

As shown in FIG. 7A, a clad plastic material 75 is extruded to the end of the passage 51 of a core glass rod 71 through the passage 55, and the core glass rod 71 is inserted to the passage 51 through the linear portion 58 of the die 57. The core glass rod 71 comprises a silica glass rod 72, which is made of the core or the core and a part of the clad, a dummy glass rod 73, which is welded to one end of the glass rod 72 and which has the same diameter as that of the silica glass rod 72, and a support rod 74, which is welded to the other end of the silica glass rod 72 and which has the same diameter as that of the silica glass rod 72 or larger than that of the silica glass rod 72.

As shown in FIG. 7B, the clad plastic material 75 is extruded to the linear portion 58 of the die 57. At this time, the clad plastic material 75 and the core glass rod 71 are integrated at the top end of the passage 51 of the core glass rod 71. Moreover, if the clad plastic material 75 is extruded, a porous molding member 76 is extruded from the top end of the die 57, and the core glass rod 71 retreats as shown in FIG. 7C.

At the time when the porous molding member 76 having the same length as the glass rod 72 is extruded, the porous molding member 76 is cut at the top end of the die as shown in FIG. 7D, and the dummy glass rod is extracted from the die. Finally, the linear portion 58 of the die 57 is divided and detached, and extra plastic material 77 existing in the linear portion 58 is cut along the top end of the taper portion 59 of the die 57, that is, the top end of the passage 51 of the core glass rod 71, and removed as shown in FIG. 7E. Thereafter, the linear portion 58 of the die 57 is attached, and the process is returned to the process shown in FIG. 7A, thereby making it possible to continuously manufacture the porous preform.

Figure 8:
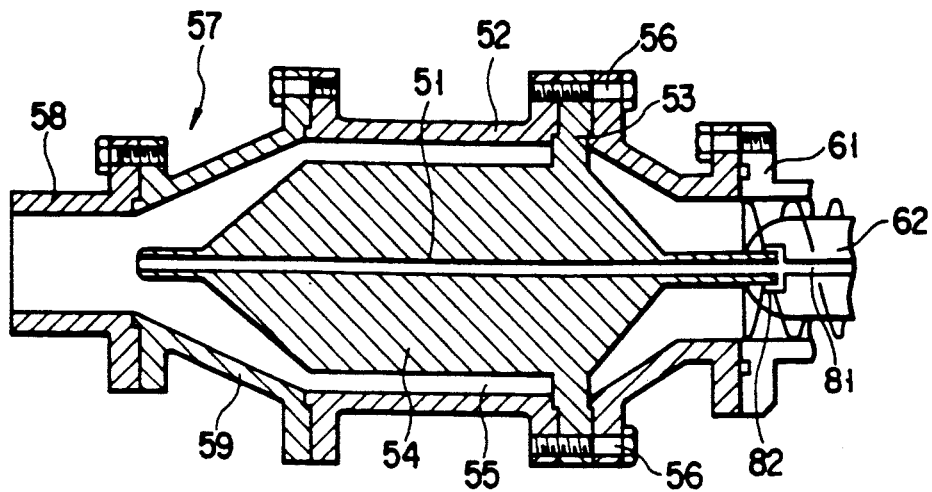
FIG. 8 is a cross sectional view showing an example of an extrusion head of the extrusion machine to be used in the present invention.

In the extrusion head of FIG. 5, the passage 51 of the core glass rod 71 is closed at the end portion of the rod holding member 54. However, as shown in FIG. 8, the passage 51 may be formed to pass through the central axis of the the rod holding member 54, and extend in the rotation axis of an auger screw 62. In this case, the passage 51 in the rod holding member 54 and a passage 81 in the rotation axis of the auger screw 62 are connected to each other at the top end of the auger screw 62. Therefore, the portion between the rod holding member 54 and the auger screw 62 is sealed by a packing or an O-shape ring 82 so as to prevent plastic material from being introduced into the passages 51 and 81. In this case, the auger screw 62 rotates, but the rod holding member 54 does not rotate since the rod holding member 54 is fixed.

Then, degreasing, dehydrating, and sintering processes are provided in the above-obtained porous preform, so that an optical fiber preform can be obtained. In a degreasing process, a binder and a surfactant is removed from a porous preform.

Examples of the present invention will be explained as follows.

EXAMPLE 1

36 parts by weight of 10% liquid solution of polyvinyl alcohol (PVA) were added to 100 parts by weight of silica fine particles having an average grain diameter of 0.7 $\mu$m synthesized by a frame hydrolyzing method. 0.3 parts by weight of polyoxyethylenealkylether as a surfactant were further added thereto, and these materials were homogeneously kneaded, so that a core plastic material was obtained. 3.5 weight % of $GeO_2$ serving as a dopant was contained in the silica fine particles in order to improve the refractive index.

3 parts by weight of methyl cellulose serving as a binder and 22 parts by weight of pure water serving as a solvent were added to 100 parts by weight of silica particles having an average grain diameter of 8 $\mu$m. 0.3 parts by weight of polyoxyethylenealkylether as surfactant were further added thereto, and these materials were homogeneously kneaded, so that a clad plastic material was obtained.

Figure 9:
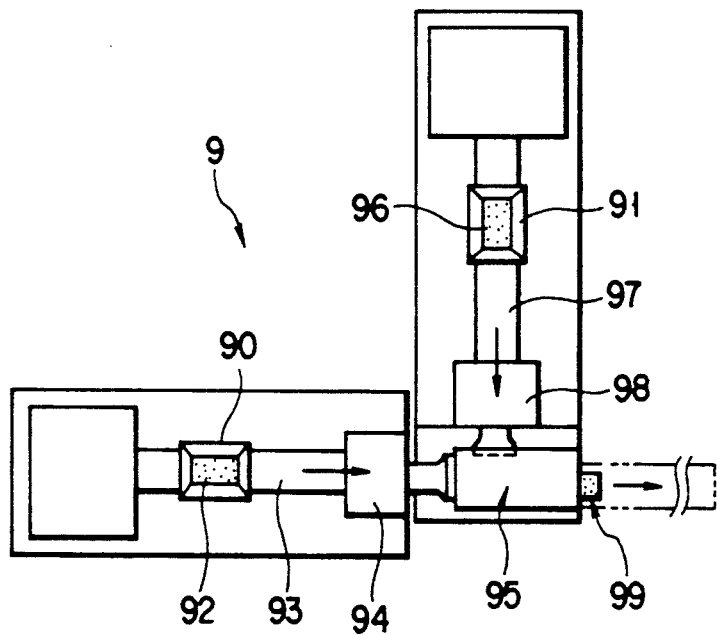
FIG. 9 is a view explaining an example of the extrusion machine to be used in the method of the present invention.

The obtained core plastic material and clad plastic material were supplied to first and second hoppers 90 and 91 of an extrusion machine 9 shown in FIG. 9, respectively and extruded and molded. In the extrusion machine 9, a core plastic material 92 was supplied to a cross head 95 via a first kneading chamber 93 and a first vacuum chamber 94. A clad plastic material 96 was supplied to the cross head 95 via a second kneading chamber 97 and a second vacuum chamber 98. In the cross head 95, the core and clad were formed, so that a rod shape porous preform 99 was obtained. In this case, the extrusion speed of the core plastic material was set to 0.2 kg/h, and the extrusion speed of the clad plastic material was set to 40 kg/h.

Next, the obtained porous preform was dried at 110° C. for 12 hours. Thereafter, a degreasing process was provided to the dried preform in air at 500° C. for 5 hours. Moreover, the preform was dehydrated with $Cl_2$ of 1200° C. under He gas atmosphere, and sintered at 1600° C. under He atmosphere, so that an optical fiber preform was manufactured.

A normal drawing process was provided to the obtained optical fiber preform, so that a single mode optical fiber having an outer diameter of 125 μm was manufactured. Then, the mechanical strength was measured. A value of the mechanical strength was made by measuring 50% values of tension strength and breaking strength of the single mode optical fiber. As a result, the value was 6.7 kgf, which was the same value as the mechanical strength of the optical fiber obtained by drawing the optical fiber preform obtained by the conventional vapor method.

Comparison

A porous preform was manufactured in the same manner as Example 1 excepting that a material containing no surfactant is used as a clad plastic material.

Similar to Example 1, degreasing and sintering processes were provided to the obtained porous preform, thereby obtaining an optical fiber preform. Then, the optical fiber preform was drawn, so that a single mode optical fiber was manufactured, and the mechanical strength was measured in the same manner as Example 1. As a result, the mechanical strength was 1.1 kgf.

EXAMPLE 2

Regarding a clad plastic material, 3 parts by weight of methyl cellulose serving as a binder and 22 parts by weight of pure water serving as a solvent were added to 100 parts by weight of silica particles having an average grain diameter of 8 μm. 0.3 parts by weight of polyoxyethylenealkylether as a surfactant were further added thereto, and these materials were homogeneously kneaded, so that the clad plastic material was obtained.

A core glass rod was manufactured by VAD method. The core glass rod to be used had a ratio of clad to core of about 3:1, a specific refractive index difference of about 0.3%, an outer diameter of about 8.5 mm, and a length of about 300 mm. A dummy rod made of silica glass having a diameter of about 8.5 mm and a length of 50 mm was connected to one end of the core glass rod, and a support glass rod having a diameter of about 25 mm and a length of 150 mm was connected to the other end.

The above-mentioned clad plastic material and the core glass rod were used and extruded and molded by the extrusion head of FIG. 5 in accordance with the processes of FIGS. 7A to 7E, thereby a porous preform was obtained.

Then, the obtained porous preform was dried at 110° C. for 12 hours. Thereafter, a degreasing process was provided to the dried preform in air at 500° C. for 5 hours. Moreover, the preform was dehydrated with $Cl_2$ of 1200° C. under He atmosphere by the normal method, and sintered at 1600° C. under He atmosphere, so that an optical fiber preform was manufactured. In these processes, neither crack nor warp was generated in the preform.

A normal drawing process was provided to the obtained optical fiber preform, so that a single mode optical fiber having an outer diameter of 125 μm was manufactured. Then, the mechanical strength was measured similar to Example 1. As a result, the value was the same value as the mechanical strength of the optical fiber obtained by drawing the optical fiber preform obtained by the conventional vapor method.

According to the above embodiment, since the passage of the plastic material in the extrusion machine is linear, and the direction is not changed, the flow of the plastic material is extremely homogeneous. Therefore, the optical fiber porous preform having neither distortion nor variation of density can be obtained. Thereby, after forming the porous preform and the following heating process, it is possible to control the generation of the crack and the warp.

According to the above-explained method for manufacturing an optical fiber preform of present invention, since a plastic material containing a surfactant is used, a preform, which can obtain an optical fiber exerting high mechanical strength, can be efficiently manufactured without generating bubble.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for manufacturing an optical fiber preform comprising:
   (a) obtaining a plastic material by kneading a silica powder, a binder, water and an non-ionic surfactant, said surfactant being in an amount of 0.01 to 0.5 parts by weight relative to 100 parts by weight of said silica powder; and
   (b) obtaining a porous preform by extrusion molding the plastic material.

2. The method according to claim 1, wherein said plastic material is extruded, thereby a core and a clad are formed at the same time.

3. The method according to claim 1, wherein the plastic material is extruded and molded in an outside portion of a core formed in advance, thereby a clad is formed.

4. The method according to claim 3, wherein the core is formed of a core portion and a part of a clad portion.

5. The method according to claim 1, wherein the silica powder has an average grain diameter of 100 μm or less.

6. The method according to claim 1, wherein the silica powder has an average volume diameter of 0.1 to 20 μm.

7. The method according to claim 6, wherein the surfactant is polyoxyethylenealkyl ether having a HLB value of 6 to 10.

8. The method according to claim 6, which further comprises adding a dopant in step (a).

9. The method according to claim 8, wherein the dopant is $GeO_2$.

10. The method according to claim 1, wherein the binder is methyl cellulose.

11. The method according to claim 7, wherein the binder is methyl cellulose.

* * * * *